(12) United States Patent
Kanteti et al.

(10) Patent No.: US 8,516,022 B1
(45) Date of Patent: Aug. 20, 2013

(54) AUTOMATICALLY COMMITTING FILES TO BE WRITE-ONCE-READ-MANY IN A FILE SYSTEM

(75) Inventors: Kumar Kanteti, Grafton, MA (US); Yingchao Zhou, Tiantongyuan (CN); Jun Guo, Beijing (CN); Sitaram Pawar, Shrewsbury, MA (US); Walter C. Forrester, Berkeley Heights, NJ (US); Jia Zhai, Beijing (CN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/348,508

(22) Filed: Jan. 11, 2012

(51) Int. Cl.
*G06F 12/00* (2006.01)
*G06F 17/30* (2006.01)

(52) U.S. Cl.
USPC .......................................... 707/827; 726/24

(58) Field of Classification Search
USPC ................... 707/872, 827; 726/24
See application file for complete search history.

(56) References Cited

U.S. PATENT DOCUMENTS

| | | | |
|---|---|---|---|
| 5,870,467 A * | 2/1999 | Imai et al. ...................... 705/57 |
| 5,901,228 A | 5/1999 | Crawford | |
| 7,225,211 B1 | 5/2007 | Colgrove et al. | |
| 7,424,497 B1 | 9/2008 | Leverett et al. | |
| 7,546,432 B2 | 6/2009 | Stacey et al. | |
| 7,631,155 B1 | 12/2009 | Bono et al. | |
| 7,870,356 B1 | 1/2011 | Veeraswamy et al. | |
| 8,055,724 B2 | 11/2011 | Amegadzie et al. | |
| 8,087,084 B1 * | 12/2011 | Andruss et al. .................. 726/24 |
| 8,161,236 B1 | 4/2012 | Noveck et al. | |
| 8,170,985 B2 | 5/2012 | Zimran et al. | |
| 8,302,193 B1 * | 10/2012 | Gardner et al. .................. 726/24 |
| 2003/0046611 A1 | 3/2003 | Muttik et al. | |
| 2003/0056069 A1 | 3/2003 | Cabrera et al. | |
| 2005/0132206 A1 * | 6/2005 | Palliyil et al. .................. 713/188 |
| 2005/0226059 A1 | 10/2005 | Kavuri et al. | |
| 2007/0106710 A1 | 5/2007 | Haustein et al. | |
| 2007/0118687 A1 * | 5/2007 | McGovern et al. ........... 711/112 |
| 2007/0174565 A1 * | 7/2007 | Merrick et al. ............... 711/161 |
| 2007/0179934 A1 | 8/2007 | Basov et al. | |

OTHER PUBLICATIONS

Vahalia, Uresh, Unix Internals: The New Frontiers, Chapter 9, "File System Implementations," 1996, p. 261-290, Prentice-Hall, Inc., New Jersey.
"EMC-Legato E-mail Archiving Solution," Solution Sheet, Jul. 2004, 4 pages, EMC Corporation, Hopkinton, MA.

(Continued)

*Primary Examiner* — Cam Truong
(74) *Attorney, Agent, or Firm* — Richard Auchterlonie; Novak Druce Connolly Bove + Quigg LLP

(57) ABSTRACT

For automatically committing a file of a file system to a WORM committed state when the file has not been modified for a certain period of time, a file server maintains a list of file identifiers and periodically scans the list to check whether or not the certain period of time has expired for each file on the list. If so, the file is committed to the WORM state. The file server also enforces an in-place lock in response to a client request to modify or delete a file when the certain period of time is found to have expired for the file. A minimum modify time and a maximum modified time are included in each entry of the list of file identifiers in order to skip entries and to reclaim memory of entries during the periodic scan.

22 Claims, 10 Drawing Sheets

(56) References Cited

OTHER PUBLICATIONS

Baltazar, Henry, "SnapLock Locks Down Info," Oct. 30, 2003, 4 pages, eWeek.com, Woburn, MA.
King, Charles, "A WORM Turn: EMC Introduces Centera Compliance Edition," Excerpt from Market Roundup, Apr. 11, 2003, one page, The Sageza Group, Mountain View, CA.
"SnapLock (TM) Compliance and SnapLock Enterprise Software," 2003, 2 pages, Network Appliance, Inc., Sunnyvale, CA.
"Information Lifecycle Management: An Automated Approach," Technical White Paper, Dec. 8, 2003, 20 pages, EMC Corporation, Hopkinton, MA.
Wendt, Jerome M., "Tech Report: Content-addressed storage preferred for fixed-content storage," Jun. 19, 2006, 5 pages, searchstorage.com, Needham, MA.
EMC Celerra Unified Storage, Mar. 2011, 6 pages, EMC Corporation, Hopkinton, MA.

* cited by examiner

AUTOMATICALLY COMMITTING FILES TO BE WRITE-ONCE-READ-MANY IN A FILE SYSTEM

FIELD OF THE INVENTION

The present invention relates generally to a file server ensuring write-once-read-many (WORM) semantics, and more particularly to a method and apparatus for automatically committing a file of a file system to a WORM committed state when the file has not been modified for a certain period of time.

BACKGROUND OF THE INVENTION

For applications that must comply with certain regulatory requirements, a file server may ensure content authenticity and retention of data for a certain period of time. Such regulatory requirements include Securities Exchange Commission (SEC) Rule 17a-4, stock exchange (NASD/NYSE) supervision requirements, and the Sarbanes-Oxley Act. For example, data has been written to CD-R optical disks to ensure content authenticity and retention of the data.

A file server using a redundant array of inexpensive magnetic disks (RAID) has been configured for ensuring content authenticity and ensuring write-once-read-many (WORM) semantics. For example, a Centera (Trademark) brand of magnetic disk-based WORM device has been offered by EMC Corporation in connection with a policy engine for automatically moving reference data from primary storage to the WORM device. As described in "EMC-LEGATO E-mail Archiving Solution," Solution Sheet, EMC Corporation, Hopkinton, Mass., July 2004, the Centera (Trademark) brand of magnetic disk-based WORM device has been used for retaining e-mail for a set period of time and also making the e-mail instantly accessible.

Another method of file retention protection uses a volume or file system attribute for indicating retention period protection in connection with file attributes such as a "read-only" flag and the "last accessed" attribute. If the volume or file system attribute is set, then the setting of the "read-only" flag for a file in the protected volume or file system gives the file and its pathname WORM properties. Once the "last accessed" attribute for such a protected file is set with a retention date, the file cannot be altered or deleted until after the retention date. See, for example, Henry Baltazar, "SnapLock Locks Down Info," eWeek.com, Woburn, Mass., Oct. 30, 2003.

SUMMARY OF THE INVENTION

In a file server ensuring write-once-read-many (WORM) semantics, it is desired to provide a method and apparatus for automatically committing a file of a file system to a WORM committed state when the file has not been modified for a certain period of time. This avoids a need for a user to issue command line or graphical user interface (GUI) operations against the file in order to commit the file to the WORM committed state.

In accordance with one aspect, the invention provides a method of operating a file server. The file server has data storage storing a file system, a data processor coupled to the data storage for access to files in the file system, and non-transitory computer readable storage medium coupled to the data processor and storing computer instructions. The computer instructions, when executed by the data processor, automatically protect the files from modification upon expiration of a certain period of time and commit the files to a write-once-read-many (WORM) committed state by the steps of: (a) placing file identifiers of the files on a list of file identifiers; (b) in response to a request from a client to modify a first file, checking whether or not the first file has been modified for the certain period of time, and in response to finding that the first file has not been modified for the certain period of time, denying the request from the client to modify the first file; and (c) periodically scanning the list of file identifiers, and upon finding a file identifier of a second file on the list of file identifiers, checking whether or not the second file has been modified for the certain period of time, and in response to finding that the second file has not been modified for the certain period of time, committing the second file to the WORM committed state.

In accordance with another aspect, the invention provides a file server. The file server includes data storage storing a file system, a data processor coupled to the data storage for access to files in the file system, and non-transitory computer readable storage medium coupled to the data processor and storing computer instructions. The computer instructions, when executed by the data processor, automatically protect the files from modification upon expiration of a certain period of time and commit the files to a write-once-read-many (WORM) committed state by the steps of: (a) placing file identifiers of the files on a list of file identifiers; (b) in response to a request from a client to modify a first file, checking whether or not the first file has been modified for the certain period of time, and in response to finding that the first file has not been modified for the certain period of time, denying the request from the client to modify the first file; and (c) periodically scanning the list of file identifiers, and upon finding a file identifier of a second file on the list of file identifiers, checking whether or not the second file has been modified for the certain period of time, and in response to finding that the second file has not been modified for the certain period of time, committing the second file to the WORM committed state.

BRIEF DESCRIPTION OF THE DRAWINGS

Additional features and advantages of the invention will be described below with reference to the drawings, in which.

Figure 1:
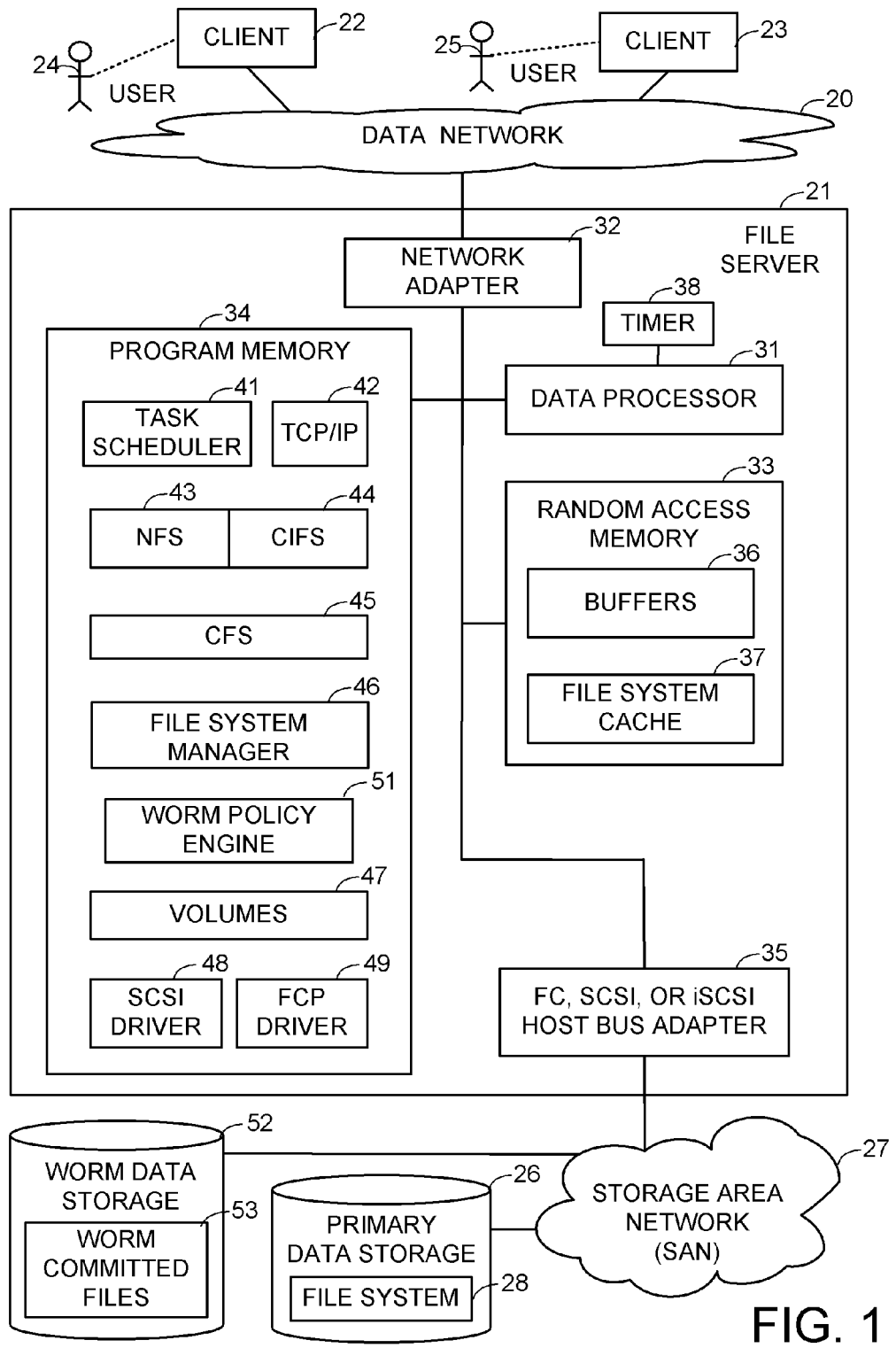
FIG. 1 is a block diagram of a file server ensuring WORM semantics and including an internal policy engine for automatically committing each regular file of a file system to a WORM committed state when each regular file that is not a system file has not been modified for a certain period of time.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data network 20 including a file server 21 for servicing file access requests from network clients 22, 23. The network clients 22, 23, for example, are workstations operated by respective human users 24, 25. The file server 21 permits the clients 22, 23 to access files in a file system 28 stored in data storage 26 linked to file server 21 via a storage area network (SAN) 27. The data storage 26, for example, is an array of disk drives.

The file server 21 includes a data processor 31, a network adapter 32 linking the data processor to the data network 20, random access memory 33, program memory 34, and a Fibre-Channel (FC), Small Computer Systems Interface (SCSI), or Internet Protocol SCSI (iSCSI) host bus adapter 35 linking the data processor to the storage area network (SAN) 27. The data processor 31 is a general purpose digital computer data processor including one or more core central processing units (CPUs) for executing computer program instructions stored in the program memory 34. The program memory 34 is a non-transitory computer readable storage medium, such as electrically erasable and programmable read-only memory (EEPROM). The random access memory 33 includes buffers 36 and a file system cache 37.

The program memory 34 includes a task scheduler program 41 for scheduling execution of program threads on a real-time basis. The task scheduler 41 is responsive to a hardware timer or real-time clock 38 that interrupts the data processor 31 on a periodic basis in order to perform certain high-priority tasks. One of these high-priority tasks is to periodically invoke the task scheduler 41 so that the task scheduler may switch execution between application code threads when it is appropriate to do so. For example, the task scheduler 41 may switch execution from a low-priority code thread to a high-priority code thread when there is work for the high-priority code thread. The task scheduler 41 may also maintain a respective software timer for a low-priority code thread and switch execution to the low-priority code thread when the software timer has expired and there is spare processing time for execution of the low-priority code thread.

The program memory 34 includes a program layer 42 for network communication using the Transmission Control Protocol (TCP) and the Internet Protocol (IP). The program memory also includes a Network File System (NFS) module 43 for supporting file access requests using the NFS file access protocol, and a Common Internet File System (CIFS) module 44 for supporting file access requests using the CIFS file access protocol.

The NFS module 43 and the CIFS module 44 are layered over a Common File System (CFS) module 45. The CFS module 45 is layered over a file system manager module 46. The file system manager module 46 supports a UNIX-based file system, and the CFS module 45 provides higher-level functions common to NFS and CIFS. The UNIX-based file system is described in Uresh Vahalia, Unix Internals—The New Frontiers, Chapter 9, File System Implementations, pp. 261-290, Prentice-Hall, Inc., Upper Saddle River, N.J. (1996). For example, the file system manager module 46 maintains the file system 28 in the primary data storage 26, and maintains the file system cache 37 in the random access memory 33.

The program memory 34 further includes a logical volumes layer 47 providing a logical volume upon which the file system 28 is built. The logical volume is configured from the data storage. For example, the logical volume is configured from one or more logical unit numbers (LUNs) of the data storage 26. The logical volumes layer 47 is layered over a SCSI driver 48 and a Fibre-Channel protocol (FCP) driver 49 in order to access the logical unit numbers (LUNs) in the storage area network (SAN) 27. The data processor 31 sends storage access requests through the host bus adapter 35 using the SCSI protocol, the iSCSI protocol, or the Fibre-Channel protocol, depending on the particular protocol used by the storage area network (SAN) 27.

The present invention more particularly relates to an internal WORM policy engine program 51 that automatically commits regular files of the file system 28 to a WORM state if a regular file has not been modified for a certain policy interval. For example, the file system 28 has a file system attribute specifying that WORM semantics are to be applied to the regular files in the file system. If WORM semantics are to be applied to the regular files in the file system, then the file system 28 also has attributes specifying a policy interval and a default retention period.

In general, the file system 28 includes regular files and special files. Special files such as directories are maintained by the file system manager 46. For example, the files in the file system 28 comprise a hierarchical structure including a root directory, one or more subdirectories, and regular files in the directories. The regular files are "leaf nodes" in this directory tree. Some of the regular files are system files. A system file is an internal file created when certain file system features are enabled; for example, a quota file, an ACI file, or a gidmap file. The regular files that are not system files are the files that the clients 22, 23 may write data to, in contrast to the special files and the system files.

The file system manager 46 provides write-once-read-many (WORM) semantics at a file level so that each regular file in the file system 28 has either a WORM clean state or a WORM committed state. In the WORM clean state, a client may access a file in a normal fashion to read, modify, or delete the file provided that the client has the usual privileges to access the file in the desired fashion. In the WORM committed state, the regular file is protected from being modified or deleted until the retention period has expired.

There are various ways of protecting a file in the WORM committed state. One way is for the file system manager 46 to protect the file from modification or deletion if certain attributes of the file have been set. Another way is for WORM committed files 53 to be copied or migrated to WORM data storage 52 so that WORM data storage 52 protects the file from modification or deletion. The WORM data storage 52 may protect the file from modification or deletion by storing the WORM committed files 53 in a data storage medium, such as CD-R optical disk, having WORM properties. Alternatively, the WORM data storage 52 may store the WORM committed files 53 in a conventional read-write storage medium, such as magnetic disk, yet enforce the WORM semantics by rejecting any data storage command to modify or delete a WORM committed file until after a retention date stored as a file attribute in the WORM committed file.

Figure 2:
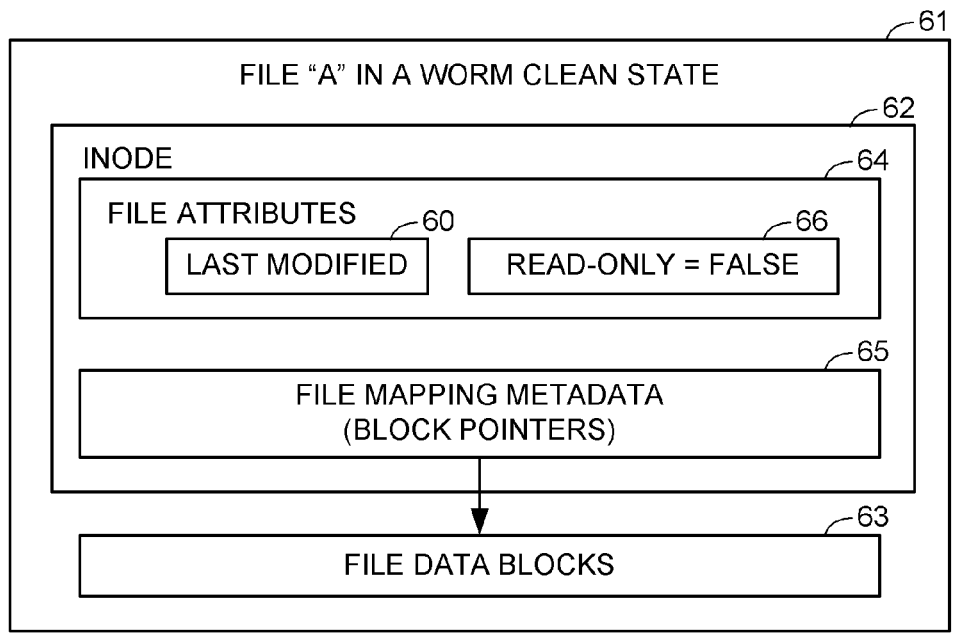
FIG. 2 is a block diagram of a first file in a WORM clean state.

For example, FIG. 2 shows a file 61 in a WORM clean state. The file 61 is stored in the file system (28 in FIG. 1) in the primary data storage (26 in FIG. 1). The file 61 includes an inode 62 and file data blocks 63. The inode 62 includes file attributes 64 and file mapping metadata 65. The file mapping metadata 65 includes block pointers pointing to the file data blocks 63. A last modified attribute 60 indicates the system time when the file 61 was created or last modified. A read-only flag 66 in the file attributes 64 is set to a logical value of "FALSE" to indicate that the file 61 is in a WORM clean state.

Figure 3:
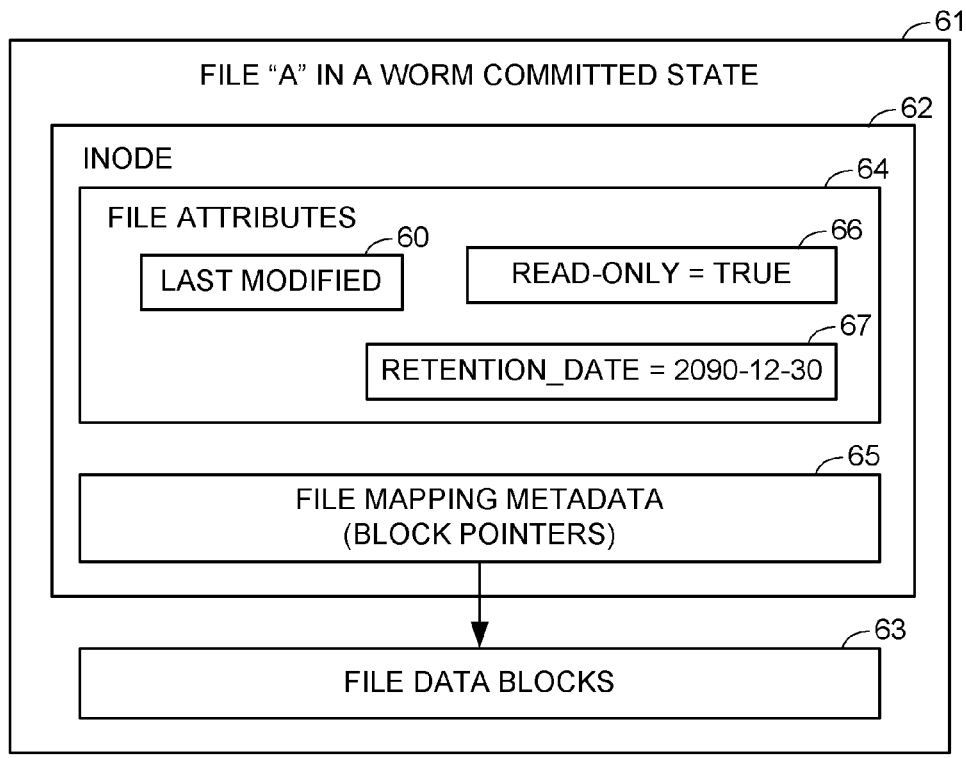
FIG. 3 is a block diagram of the first file of FIG. 2 in a WORM committed state.

FIG. 3 shows the file 61 in a WORM committed state. The file includes the inode 62, the same file data blocks 63, file attributes 64, and the same file mapping metadata 65. The read-only flag 66 has been changed to a logical value of "TRUE" to indicate that the file 61 is in the WORM committed state. In addition, the file attributes include a retention date 67 set to an alphanumeric value of "2090-12-30" indicating that the file 61 should not be modified or deleted until after this retention date. The retention date is determined when the file is committed to the WORM committed state by adding the retention period of the file system to the date when the file is committed to the WORM committed state.

Figure 4:
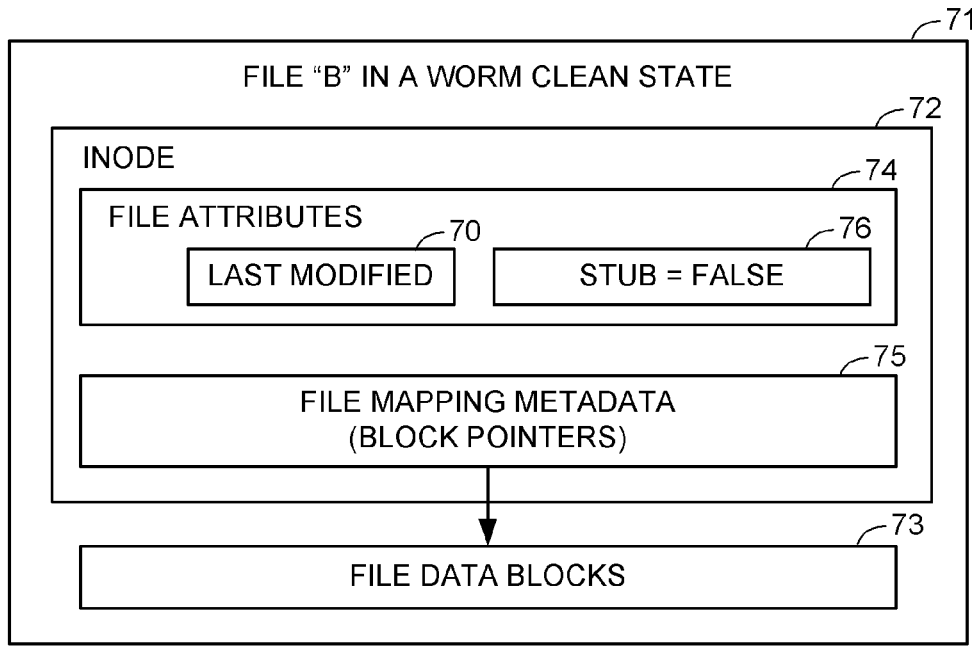
FIG. 4 is a block diagram of a second file in a WORM clean state.

FIG. 4 shows another example of a file 71 in a WORM clean state. The file 71 is stored in the file system (28 in FIG. 1) of the primary data storage (26 in FIG. 1.) The file 71 includes an inode 72 and file data blocks 73. The inode 72 includes file attributes 74 and file mapping metadata 75. The file mapping metadata 75 includes block pointers pointing to the file data blocks 73. A last modified attribute 70 indicates the system time when the file 71 was created or last modified. A stub flag 76 in the file attributes 74 is set to a logical value of "FALSE" to indicate that the file 71 is in a WORM clean state.

Figure 5:
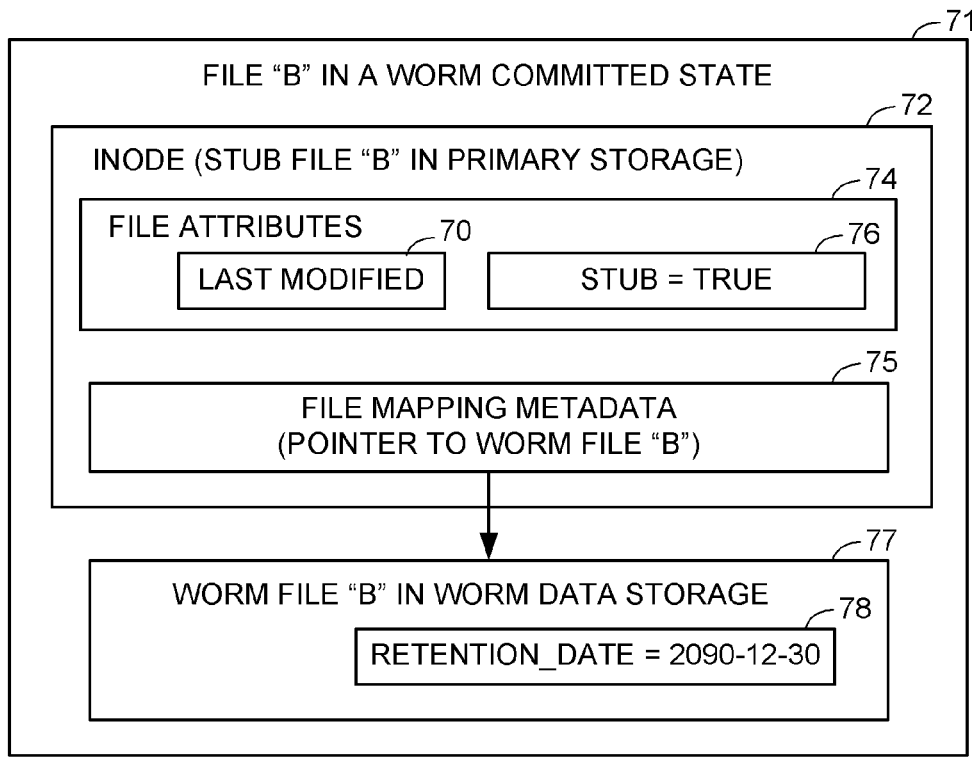
FIG. 5 is a block diagram of the second file of FIG. 4 in a WORM committed state.

FIG. 5 shows the file 71 in a WORM committed state. The file 71 includes the inode 72 in the file system (28 in FIG. 1) in the primary data storage (26 in FIG. 1), and an associated WORM file 77 in the WORM data storage (52 in FIG. 1). The WORM file 77 is a copy of the original file (71 in FIG. 2) when the original file was in the WORM clean state, except that a retention date 78 having an alphanumeric value of "2090-12-30" has been added to the file attributes to indicate that the file 71 should not be modified or deleted until after Dec. 30, 2090. The stub flag 76 in FIG. 5 has been changed to a logical value of "TRUE" to indicate that the file 71 is in the WORM committed state, and the file mapping metadata 75 has been changed to point to the WORM file 77 in the WORM data storage.

Figure 6:
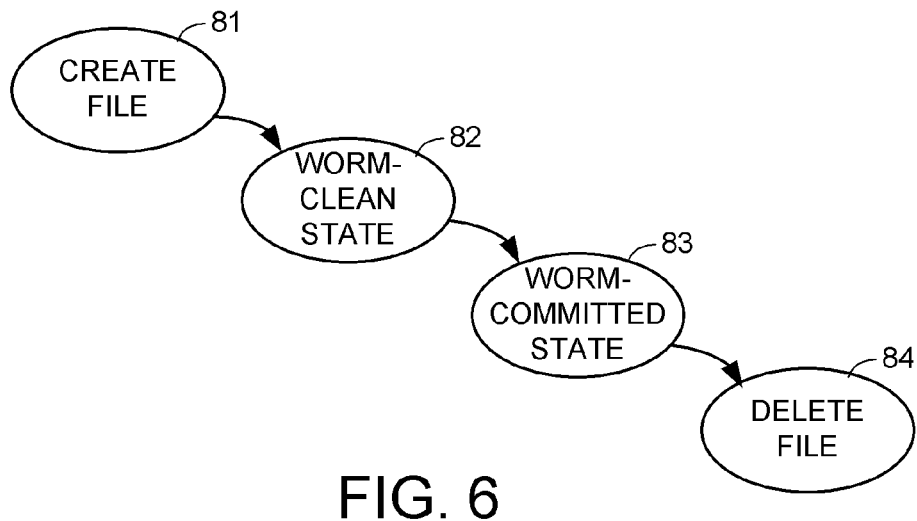
FIG. 6 is a state diagram for a file showing the WORM clean state and the WORM committed state during the lifecycle of the file.

FIG. 6 shows the typical lifecycle of a regular file that is not a system file in the file system (28 in FIG. 1). A "create file" process 81 results in the file having a WORM clean state 82. A client having proper access permissions may read, modify, or delete the file when the file is in the WORM clean state 82. The file remains in the WORM clean state 82 until the file server changes the state of the file to a WORM committed state 83. When the file is in the WORM committed state 83, a client having proper access permission may read but not modify the file. In the WORM committed state 83, the file is not deleted until after its retention date. The file then remains in the WORM committed state 83 until the file is deleted in a "delete file" process 84.

Figure 7:
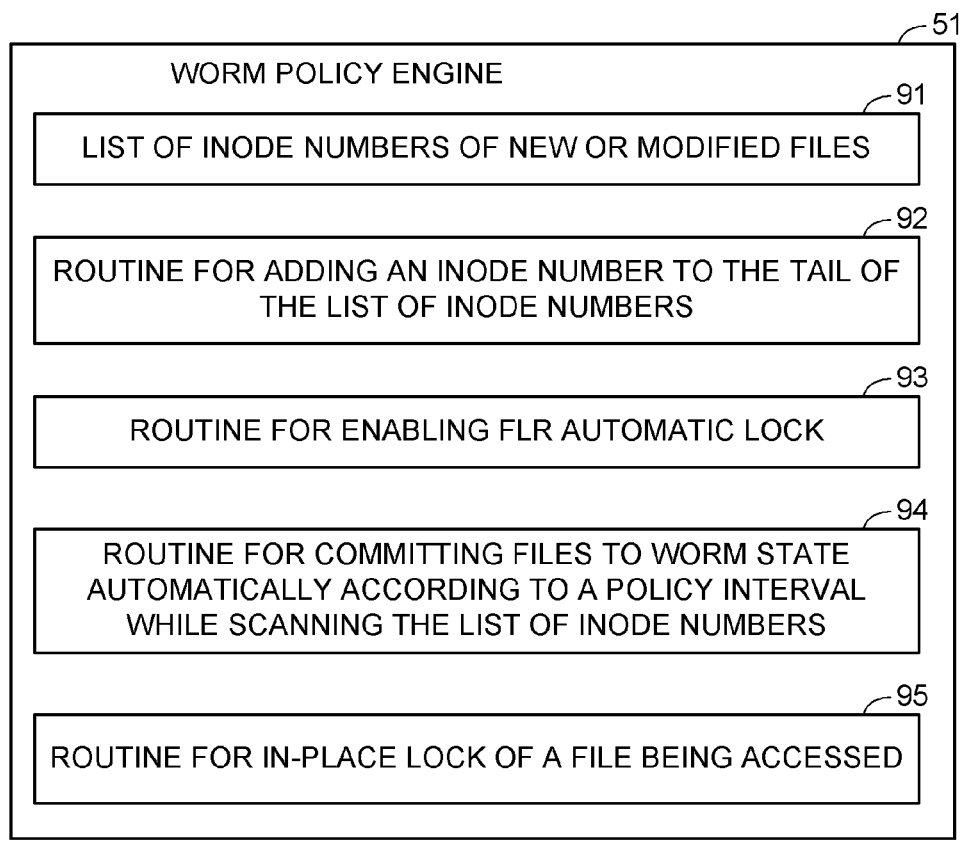
FIG. 7 is a block diagram of the WORM policy engine introduced in FIG. 1.

FIG. 7 shows details of the internal WORM policy engine 51. The WORM policy engine 51 automatically commits files to the WORM committed state by maintaining a list of inode numbers 91 and periodically scanning this list to find files for which the policy interval has expired. The inode numbers are file identifiers of files in the file system (28 in FIG. 1). In other words, each file in the file system has an inode number that is unique among the inode numbers of the files in the file system. The inode number of a file also provides an address of the Mode of the file in order to access the attributes or file mapping metadata in the Mode of the file.

The WORM policy engine 51 has a routine 92 for adding an Mode number to the tail of the list 91 of Mode numbers. The routine 92 is invoked to add an Mode number to the tail of the list 91 when a file is created or modified. The WORM policy engine 51 also has a routine 93 for initially enabling the file level retention (FLR) automatic lock feature. The routine 93 scans the file system to add Mode numbers of the regular files to the list 91 of Mode numbers and then to initiate periodic scanning of the list 91. The scanning of the list 91 is performed in background by a routine 94 for committing files to the WORM committed state automatically according to the policy interval.

The WORM policy engine 51 also includes a routine 95 for in-place lock of a file being accessed in order to strictly enforce the policy interval. The in-place lock prevents a file having an expired policy interval from being modified until the background scanning routine 94 detects the expired policy interval and commits the file to the WORM committed state. Therefore the background scanning can be performed at a relatively slow rate at a period of about one-half of the policy interval in a way that is transparent to client read and write operations, yet the policy interval is enforced to a much higher precision.

By setting the scan interval to a fraction of the policy interval, it is also possible to ensure that the entire Mode number list will be scanned over one policy interval so that that the files are promptly committed to the WORM committed state after expiration of the policy interval and list memory is recovered quickly. For example, the background scanning is performed at a rate of one-half of the policy interval so that the entire inode number list is scanned over one policy interval and an entry need be kept on the list for no longer than twice the policy interval. When it is found that an entry has been on the inode number list for more than twice the policy interval, the entry is removed from the list so that its memory is recovered.

Figure 8:
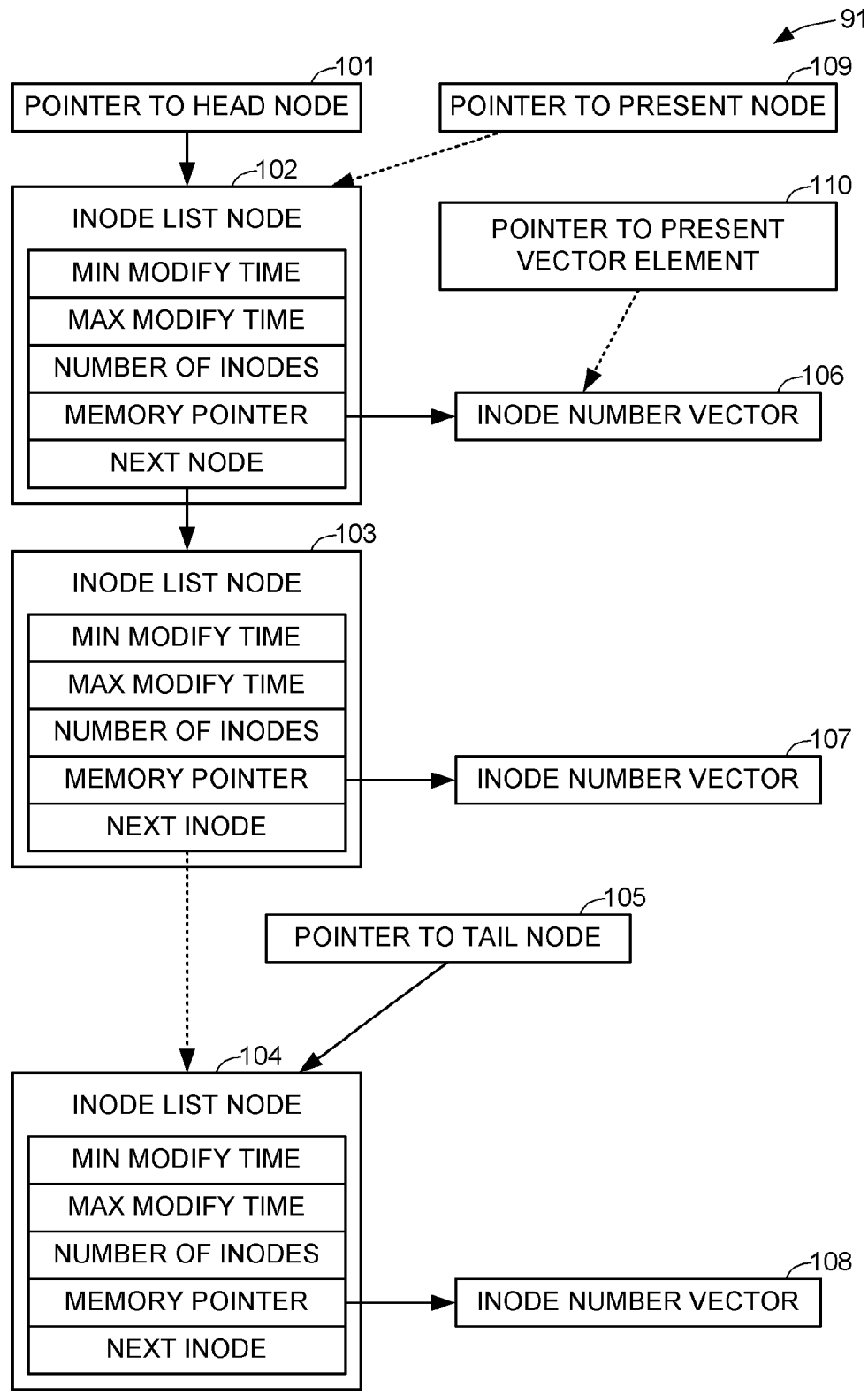
FIG. 8 is a block diagram of a list of inode numbers of new or modified files in the file system in FIG. 1.

FIG. 8 shows the preferred organization of the list 91 of inode numbers. It is possible to use a single-link list 91 of dynamically-allocated memory without any need to search the list for a specified inode number. Yet it is possible to scan the list 91 and recover memory in an efficient manner by keeping certain summary information in the list.

The list 91 includes a series of nodes 102, 103, 104 having single links between these nodes. Each of the nodes 102, 103, 104 is a list entry that may store multiple inode numbers. The list 91 also includes a pointer 101 to the head node 102, and a pointer to the tail node 103. Each node has an associated inode number vector 106, 107, 108. Each inode number vector 106, 107, 108 is a dynamically-allocated array having a fixed size to store a certain maximum number of inode numbers. For example, each inode number is an eight-byte word, and each inode number vector may contain up to sixty-four inode numbers. For scanning the list 91, the list has an associated pointer 109 to a present node, and a pointer 110 to a present vector element of the inode number vector of the present node.

Each node 102, 103, 104 has several fields. These fields store a min modify time, a max modify time, a number of inode numbers in the inode vector, a memory pointer to the associated inode number vector, and a pointer to the next node in the list. The min modify time is the minimum modify time attribute of the inodes indicated by the inode numbers in the inode vector. The max modify time is the maximum modified time of the last inode in this node.

Figure 9:
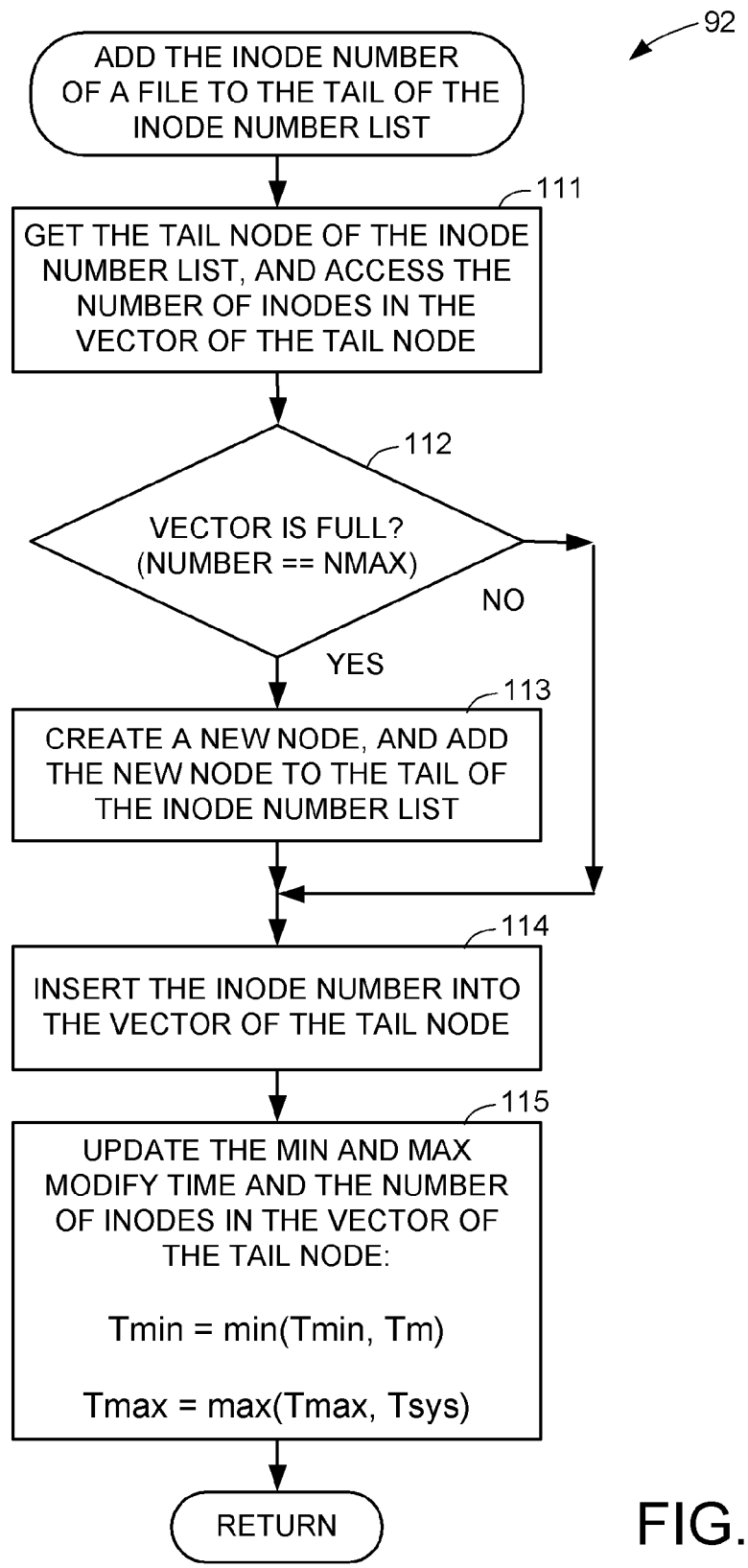
FIG. 9 is a flowchart of a procedure for adding the inode number of a file to the tail of the inode number list of FIG. 8.

FIG. 9 shows the procedure for adding the inode number of a file to the tail of the inode number list. This procedure is invoked under three different conditions. The first condition is when FLR automatic lock is enabled for a file system. In this case the whole file system is scanned, and the inode number of each regular file of the file system is added to the tail of the inode number list if the regular file is not a system file and the policy interval has not expired for the file. Otherwise, the regular file is committed immediately to the WORM committed state if the regular file is not a system file. This is described further below with reference to steps 119, 120, 121, and 122 of FIG. 10.

The second condition is when a regular file that is not a system file is created or modified. In this case the inode number of the file is added to the tail of the inode number list. This may occur multiple times for the same file before the file is ever committed to the WORM committed state. This is described further below with reference to step 181 of FIG. 14.

The third condition may occur during the periodic scanning of the inode number list if a user manually changes the modify time of the file so that it is found that the modify time of the file is in the future (Tm>Tsys). In this case the inode number of the file is added to the tail of the inode number list again. This is described further below with reference to steps 139, 140, and 141 of FIG. 11.

In a first step 111 of FIG. 9, the tail node pointer is obtained and used to get the tail node of the inode number list and to access the number of inodes in the associated inode number vector of the tail node. In step 112, if the vector is full, as indicated by the number of inodes being equal to a maximum number, then in step 113 a new node is created and added to the tail of the inode number list. The new node is created by allocating memory for the node, setting the min modify time to a minimum value, setting the max modify time to a maximum value, setting the number of inodes to zero, allocating memory for an associated vector of inode numbers, and setting the memory pointer to point to the associated vector of inode numbers. After step 113, execution continues to step 114. Execution also continues to step 114 from step 112 if the vector of the tail node is not full.

In step 114, the inode number of the file is inserted into the inode number vector of the tail node. The number of inodes in the tail node is used as a vector array index for inserting the inode number of the file into the inode number vector of the tail node. In step 115, the min modify time and the max modify time and are updated, and the number of inodes in the vector of the tail node is incremented by one. The min modify time is updated as the minimum of the min modify time and the modify time attribute of the file. The max modify time is updated as the maximum of the max modify time and the present value of the system time (Tsys). After step 115, execution returns.

Figure 10:
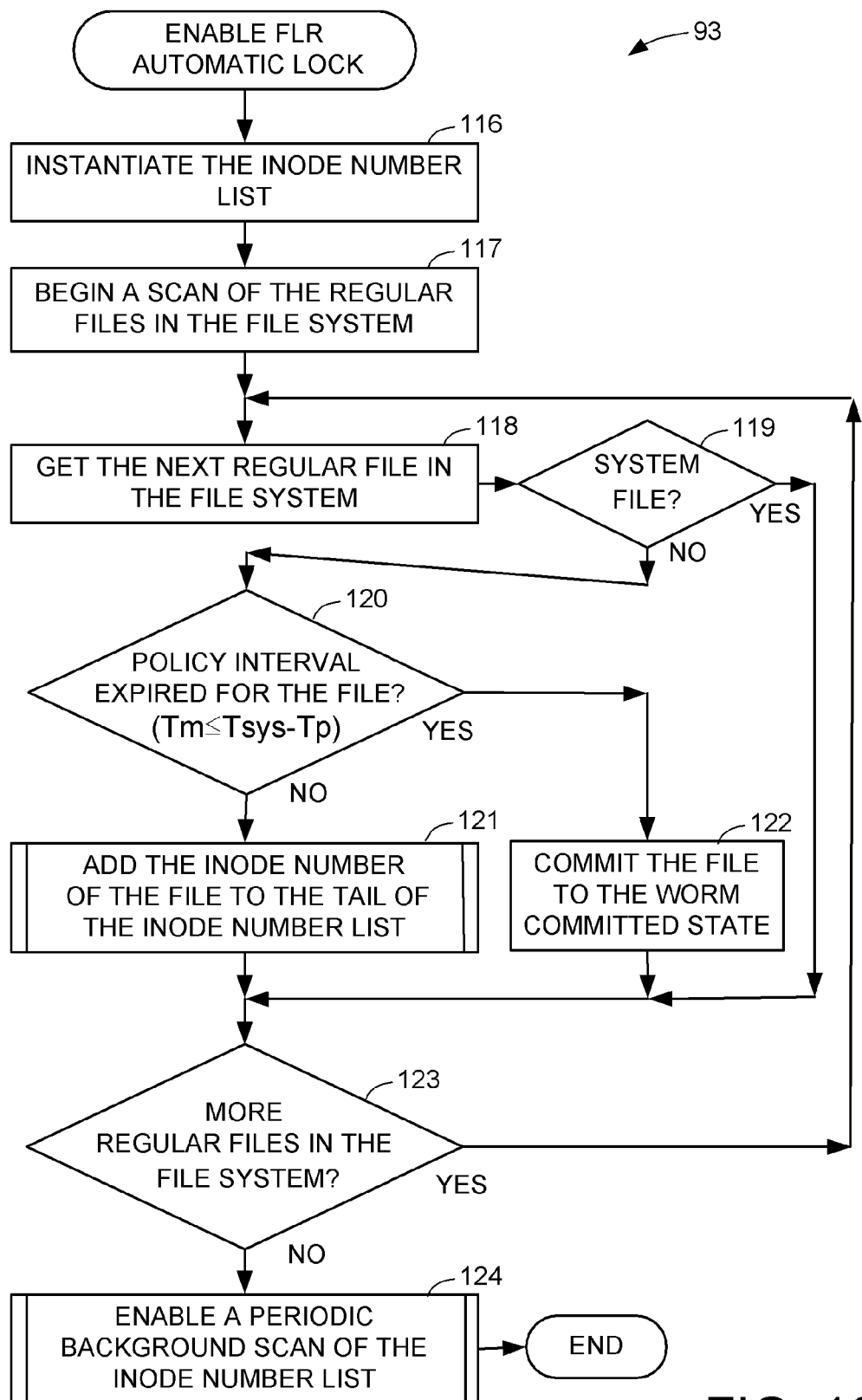
FIG. 10 is a flowchart of a procedure for enabling file level retention (FLR) automatic lock upon the file system in the file server of FIG. 1.

FIG. 10 shows the procedure 93 for enabling file level retention (FLR) automatic lock upon a file system. In a first step 116, the inode number list is instantiated. For example, the inode number list is instantiated with one inode list node and its associated inode number vector. The pointer to head node (101 in FIG. 8), the pointer to tail node (105), and the pointer to present node (109) initially point to this one inode list node, which is initialized as described above with reference to step 113 of FIG. 9. The pointer to present vector element (110 in FIG. 8) is initially set to zero.

In step 117, a scan is begun of the regular files in the file system. In step 118, the next regular file in the file system is obtained. In step 119, if the regular file is not a system file, then execution continues to step 120. If the policy interval has not expired for the file, then execution continues to step 121 to add the inode number of the file to the tail of the inode number list. The policy interval has expired for the file if $Tm \leq Tsys-Tp$, where Tm is the value of the file's modification time attribute, Tsys is the value of the system clock time, and Tp is the value of the policy interval attribute of the file system. If the policy interval has expired for the file, then execution branches from step 120 to step 122 to commit the file to the WORM committed state. After step 121 or 122, execution continues to step 123. Execution also branches from step 119 to step 123 if the regular file is a system file.

In step 123, if there are more regular files in the file system, execution loops back to step 118. Otherwise, if all of the regular files have been scanned, execution continues from step 123 to step 124. In step 124, a periodic background scan of the inode number list is enabled by invoking the subroutine of FIG. 11.

Figure 11:
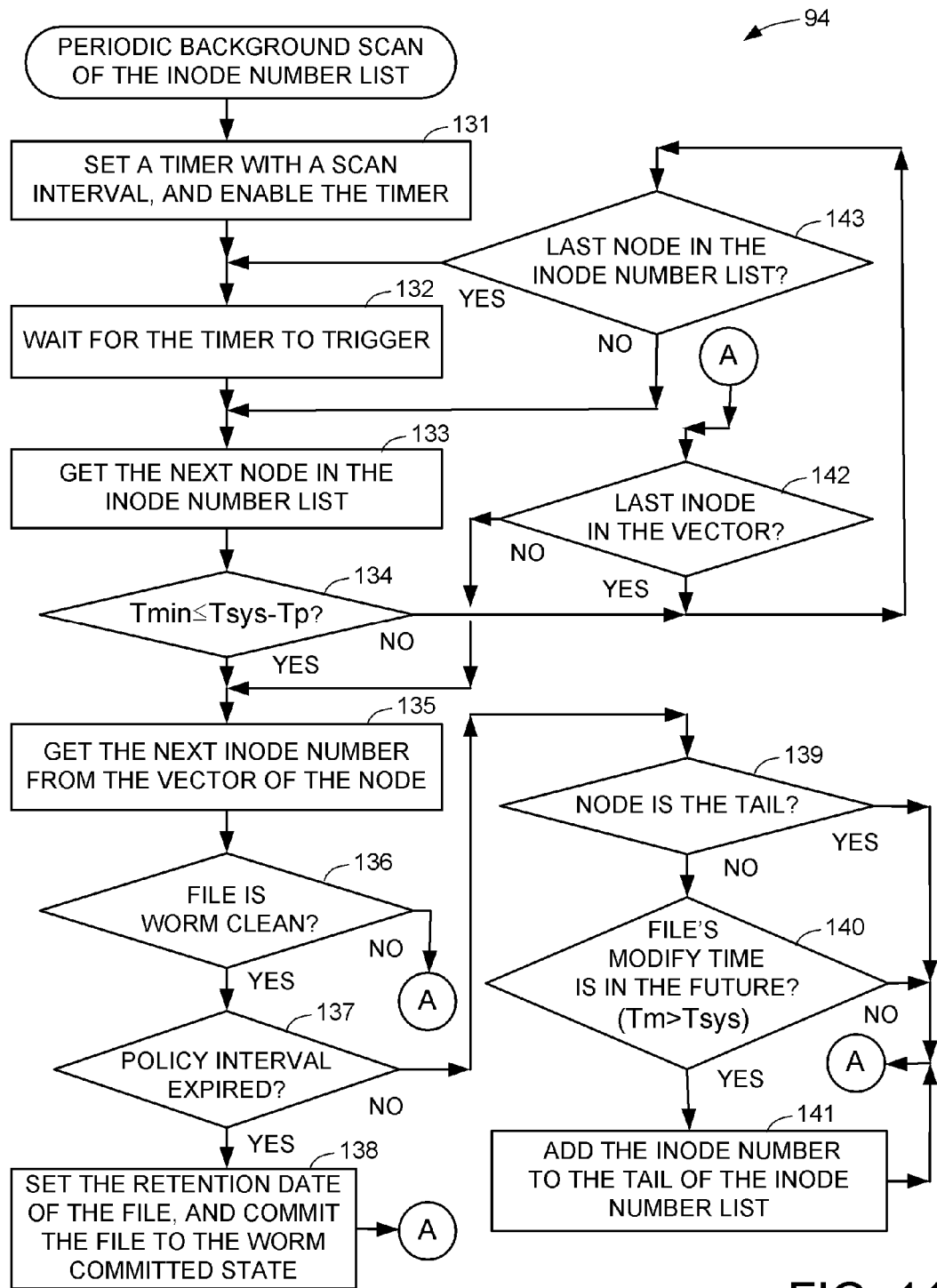
FIG. 11 is flowchart of a procedure for performing a periodic background scan of the inode number list of FIG. 8.

FIG. 11 shows the procedure 94 for performing the periodic background scan of the inode number list. In a first step 131, a timer is set with a scan interval, and the timer is enabled. The scan interval, for example, is one-half of the policy interval for the file system. Next, in step 132, execution waits for the timer to trigger. For example, execution of the scanning thread is suspended until the timer triggers, causing the thread scheduler to resume execution of the scanning thread when there is spare processing time. In step 133, the pointer to present node (109 in FIG. 8) is used to access the next node in the inode number list. Initially this is the head node of the list.

In step 134, the minimum time ($T_{min}$) in the node is compared to the difference between the present system time (Tsys) and the policy interval (Tp). If the policy interval has not expired for the minimum time ($T_{min} \leq Tsys-Tp$), then there is no need to test for policy interval expiration for any of the inode numbers of the node, so that execution branches in this case to step 143 to skip over the inode numbers of the node. Otherwise, execution continues to step 135. In step 135, the pointer to present vector element (110 in FIG. 8) is used to get the next inode number from the vector of the node. For example, the pointer to present vector element (110 in FIG. 8) is checked against the number of inodes in the node, so if there are no inodes in the inode number list, or if there are no more inodes in the inode number list (step 142), then scanning of the node is finished, and execution continues to step 143. When the next inode is obtained, execution continues from step 135 to step 136.

In step 136, if the file is in the WORM clean state, then execution continues to step 137. In step 137, if the policy interval has expired for the file (i.e., $Tm \leq Tsys-Tp$), then execution continues to step 138 to set the retention date of the file, and to commit the file to the WORM committed state. Otherwise, if the policy interval has not expired for the file, then execution branches to step 139.

In step 139, if the present node is not the tail, then execution continues to step 140. In step 140, if the file's modify time is in the future (Tm>Tsys), then execution continues to step 141. In step 141, the inode number of the file is added to the tail of the inode number list. Execution continues from steps 138 and 141 to step 142. Execution also continues to step 142 from step 136 if the file is not WORM clean (i.e., it is WORM committed), and from step 139 if the node is the tail of the inode number list, and from step 140 if the file's modify time is not in the future.

In step 142, if the present inode number is not the last inode number in the inode number vector, then execution branches to step 135 to continue scanning by scanning the next inode number in the inode number vector. Otherwise, execution continues from step 142 to step 143. In step 143, if the present node is not the last node in the inode number list (i.e., not the tail), then execution continues to step 133 to continue scanning by scanning the next node in the inode number list. In step 143, if the present node is the last node in the inode number list, then the entire list has been scanned, and execution branches back to step 132 to wait for the timer to trigger before scanning the entire list again.

Figure 12:
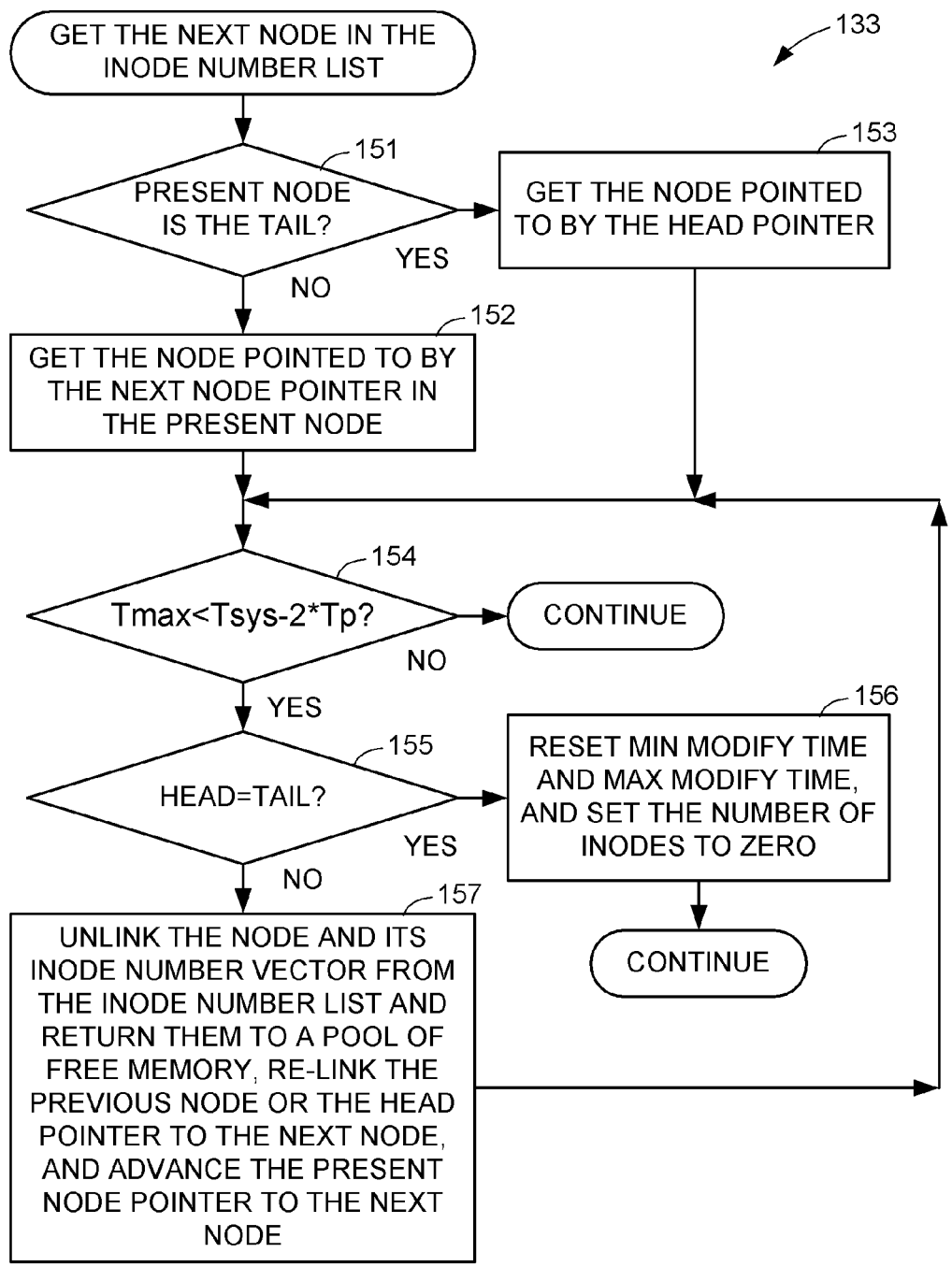
FIG. 12 is a flowchart showing steps for memory recovery during the operation of getting the next node in the inode number list in FIG. 11.

FIG. 12 shows memory recovery during the operation 133 of getting the next node in the inode number list. In a first step 151, if the present node is not the tail, then execution continues to step 152. In step 152, the node pointed to by the next node pointer in the present node is obtained. In other words, the pointer to the present node (109 in FIG. 8) is set equal to the next node pointer in the present node, so that the pointer to the present node is advanced to the next node in the inode number list in order to access the fields in this next node. Otherwise, in step 151, if the present node is the tail, then in step 153, then the node pointed to by the head pointer is obtained. In other words, the pointer to the present node (109 in FIG. 8) is set equal to the head pointer. After step 152 or 153, execution continues to step 154.

In step 154, if the maximum modify time ($T_{max}$) for the present node is less than the system time (Tsys) minus twice the policy interval (Tp), then all of the files in the inode number vector of the current node have been committed to WORM state or the inode number has been added to the tail of the inode number list again. Therefore the memory of the node and its associated inode number vector can be reclaimed. If so, execution continues to step 155. If not, the procedure of FIG. 12 is finished, and execution continues (to step 134 in FIG. 11).

In step 155, if the value of the head pointer (101 in FIG. 8) is equal to the value of the tail pointer (105 in FIG. 8), then there is only one node left in the inode number list. In this case, it is efficient to keep the node and its associated inode vector in the list, so that the inode number list always has at least one node. Therefore, if the value of the head pointer is equal to the value of the tail pointer, execution branches to step 156 to reset the min modify time to a minimum value, and to reset the max modify time to a maximum value, and set the number of inodes to zero. Then the list is empty of inode numbers but ready to store immediately an inode number when a regular file is created in the file system. After step 156, the procedure of FIG. 12 is finished, and execution continues (to step 134 in FIG. 11).

In step 155, if the value of the head pointer is not equal to the value of the tail pointer, then execution continues to step 157. In step 157, the node and its inode number vector are unlinked from the inode number list and returned to a pool of free memory, the previous node or the head pointer is re-linked to the next node, and the present node pointer is advanced to the next node. Then execution loops from step 157 back to step 154.

Figure 13:
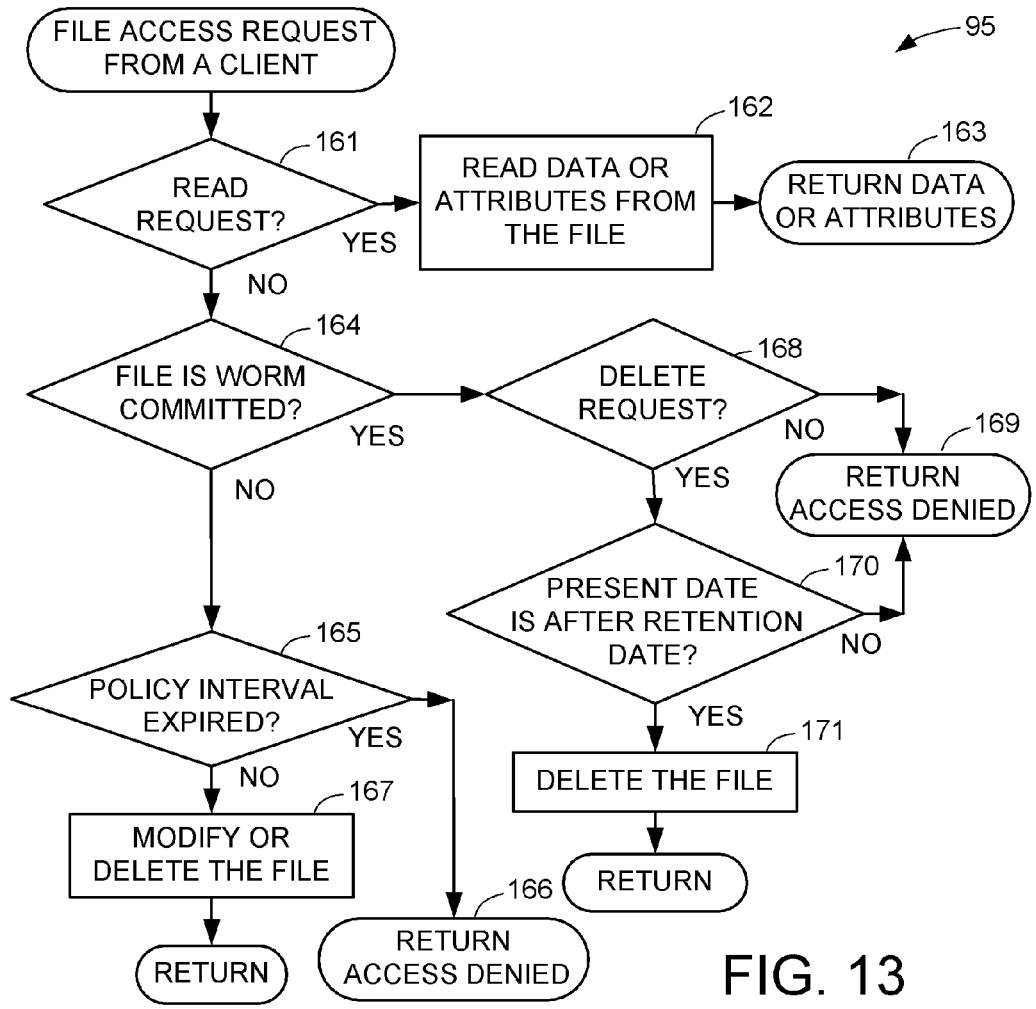
FIG. 13 is a flowchart of a procedure for responding to a file access request and performing an in-place lock when a policy interval has expired for a WORM clean file and modification or deletion of the WORM clean file is requested.

FIG. 13 shows the procedure 95 for responding to a file access request from a client and performing an in-place lock when a policy interval has expired for a WORM clean file and modification or deletion of a WORM clean file is requested. In a first step 161, if the file access request is a read request, then execution branches to step 162. In this case, the request is granted, and in step 162 data or attributes are read from the file. Then in step 163, the data or attributes are returned to the client.

In step 161, if the file access request is not a read request, then the request is a request to modify or delete the file. In this case execution continues from step 161 to step 164. In step 164, if the file is not in the WORM committed state, then execution continues to step 165. In step 165, if the policy interval has expired for the file (i.e., Tm≦Tsys-Tp), then execution branches to step 166 to return an "access denied" message to the client. Otherwise, if the policy interval has not expired for the file, execution continues from step 165 to step 167. In step 167, the file system manager modifies or deletes the file as requested, and then execution returns. In step 167, if the file is modified, then the inode number of the file is added to the tail of the inode number list, as shown in step 181 in FIG. 14.

In step 164 of FIG. 13, if the file is in the WORM committed state, then execution branches to step 168. In step 168, if the file access request is not a delete request, then execution branches to step 169 to return an "access denied" message to the client. Otherwise, if the file access request is a delete request, then execution continues from step 168 to step 170. In step 170, if the present date is not after the retention date for the file, then execution branches to step 169 to return an "access denied" message to the client. Otherwise, if the present date is after the retention date for the file, then execution continues to step 171. In step 171, the file system manager deletes the file, and then execution returns.

Figure 14:
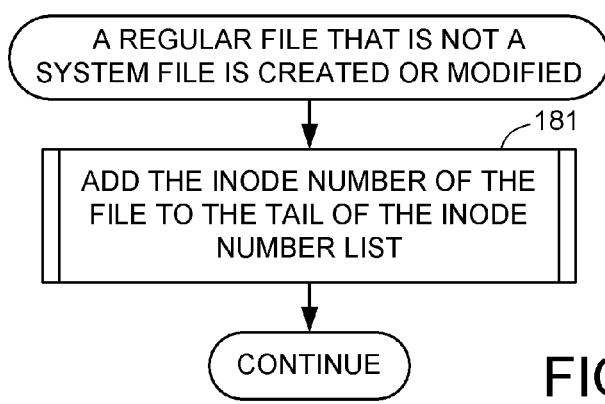
FIG. 14 is a flowchart showing that an inode number of a regular file that is not a system file is added to the tail of the inode number list when the file is created or modified.

FIG. 14 shows that an inode number of a regular file that is not a system file is added to the tail of the inode number list in step 181 when the file is created or modified. In this way, it is possible for the same inode number to appear in multiple places in the inode number list. This does not cause any problems because whenever an inode number is found on the inode number list during the background scan, the WORM state is checked in step 136 of FIG. 11 so that steps 137 to 141 of FIG. 11 are skipped over if the file has already been committed to the WORM committed state. Each instance of the inode number will remain on the inode number list until it is removed from the list in steps 156 or 157 of FIG. 12.

In view of the above, a file server automatically commits a file of a file system to a WORM committed state when the file has not been modified for a certain period of time. The file server maintains a list of file identifiers and periodically scans the list to check whether or not the certain period of time has expired for each file on the list. If so, the file is committed to the WORM state. The file server also enforces an in-place lock in response to a client request to modify or delete a file when the certain period of time is found to have expired for the file. A minimum modify time and a maximum modified time are included in each entry of the list of file identifiers in order to skip entries and to reclaim memory of entries during the periodic scan. For example, if the minimum modify time is not less than or equal to the difference between the present system time and the certain period of time, then the entry of the list is skipped. If the maximum modified time is less than the difference between the present system time and twice the certain period of time, then the entry is removed from the list and the memory of the entry is reclaimed.

What is claimed is:

1. A method of operating a file server, the file server having data storage storing a file system, a data processor coupled to the data storage for access to files in the file system, and non-transitory computer readable storage medium coupled to the data processor and storing computer instructions, wherein the computer instructions, when executed by the data processor, automatically protect the files from modification upon expiration of a certain period of time and commit the files to a write-once-read-many (WORM) committed state by the steps of:
- (a) placing file identifiers of the files on a list of file identifiers;
- (b) in response to a request from a client to modify a first file, checking whether or not the first file has been modified for the certain period of time, and in response to finding that the first file has not been modified for the certain period of time, denying the request from the client to modify the first file; and
- (c) periodically scanning the list of file identifiers, and upon finding a file identifier of a second file on the list of file identifiers, checking whether or not the second file has been modified for the certain period of time, and in response to finding that the second file has not been modified for the certain period of time, committing the second file to the WORM committed state;
wherein the list of file identifiers includes entries for storing the file identifiers, and each entry stores multiple file identifiers, and each entry has a minimum modification time attribute indicating a minimum value of modification time attributes of the files identified by the file identifiers stored in said each entry, and the step (c) of periodically scanning the list of file identifiers includes skipping over the file identifiers in said each entry when the minimum modification time attribute of said each entry indicates that none of the files indicated by the file identifiers stored in said each entry has not been modified for more than a certain interval of time.

2. The method as claimed in claim 1, wherein the list of file identifiers is a single-link list, and the method does not search the list of file identifiers for a specified file identifier.

3. The method as claimed in claim 1, wherein step (a) includes placing a first instance of a file identifier identifying a third file on a tail of the list of file identifiers when the third file is created, and later placing a second instance of the file identifier of the third file on the tail of the list of file identifiers when the third file is modified.

4. The method as claimed in claim 1, which further includes placing a second instance of the file identifier of a third file on the tail of the list of file identifiers when a first instance of a file identifier of the third file is found on the list of file identifiers during scanning of the list of file identifiers and the third file is found to have a modification time attribute specifying a modification time in the future.

5. The method as claimed in claim 1, which further includes an initial step of scanning the entire file system, and for each regular file found in the file system, adding a file identifier of said each regular file to a tail of the list of file identifiers, and after the initial step of scanning the entire file system, enabling the periodic scanning of step (c).

6. The method as claimed in claim 1, wherein step (b) is performed on a priority basis over the periodic scanning in step (c) so that the periodic scanning in step (c) is performed in background in a fashion transparent to the client.

7. The method as claimed in claim 1, wherein the file system has a policy interval attribute specifying the certain period of time, and the first file has a modification time attribute specifying when the first file was created or last modified, and the checking of whether or not the first file has been modified for the certain period of time in the step (b) is performed by comparing a value of the modification time attribute of the first file to a difference between a present system time and a value of the policy interval attribute.

8. The method as claimed in claim 1, wherein the list of file identifiers includes entries for storing the file identifiers, and each entry has a modified time attribute indicating a system time when a file identifier was last stored in said each entry, and the step (c) of periodically scanning the list of file identifiers includes removing said each entry from the list of file identifiers when the modified time attribute of said each entry indicates that the entry is no longer useful for committing files to the WORM committed state.

9. The method as claimed in claim 8, wherein the periodic scanning in step (c) is performed at a scan interval that is one-half of the certain period of time, and a system time attribute of said each entry indicates that the entry is no longer useful for committing the file to the WORM committed state when a value of the modified time attribute is less than a difference between the present system time and twice policy interval.

10. A file server comprising:
data storage storing a file system;
a data processor coupled to the data storage for access to files in the file system; and
non-transitory computer readable storage medium coupled to the data processor and storing computer instructions, wherein the computer instructions, when executed by the data processor, automatically protect the files from modification upon expiration of a certain period of time and commit the files to a write-once-read-many (WORM) committed state by the steps of:
- (a) placing file identifiers of the files on a list of file identifiers;
- (b) in response to a request from a client to modify a first file, checking whether or not the first file has been modified for the certain period of time, and in response to finding that the first file has not been modified for the certain period of time, denying the request from the client to modify the first file; and
- (c) periodically scanning the list of file identifiers, and upon finding a file identifier of a second file on the list of file identifiers, checking whether or not the second file has been modified for the certain period of time, and in response to finding that the second file has not been modified for the certain period of time, committing the second file to the WORM committed state;
wherein the list of file identifiers includes entries for storing the file identifiers, and each entry stores multiple file identifiers, and each entry has a minimum modification time attribute indicating a minimum value of modification time attributes of the files identified by the file identifiers stored in said each entry, and the step (c) of periodically scanning the list of file identifiers includes skipping over the file identifiers in said each entry when the minimum modification time attribute of said each entry indicates that none of the files indicated by the file identifiers stored in said each entry has not been modified for more than a certain interval of time.

11. The file server as claimed in claim 10, wherein the list of file identifiers is a single-link list, and the execution of the computer instructions does not search the list of file identifiers for a specified file identifier.

12. The file server as claimed in claim 10, wherein step (a) includes placing a first instance of a file identifier identifying a third file on a tail of the list of file identifiers when the third file is created, and later placing a second instance of the file identifier of the third file on the tail of the list of file identifiers when the third file is modified.

13. The file server as claimed in claim 10, which further includes placing a second instance of a file identifier of a third file on a tail of the list of file identifiers when a first instance of the file identifier of the third file is found on the list of file identifiers during scanning of the list of file identifiers and the third file is found to have a modification time attribute specifying a modification time in future.

14. The file server as claimed in claim 10, which further includes an initial step of scanning the entire file system, and for each regular file found in the file system, adding a file identifier of said each regular file to a tail of the list of file identifiers, and after the initial step of scanning the entire file system, enabling the periodic scanning of step (c).

15. The file server as claimed in claim 10, wherein step (b) is performed on a priority basis over the periodic scanning in step (c) so that the periodic scanning in step (c) is performed in background in a fashion transparent to the client.

16. The file server as claimed in claim 10, wherein the file system has a policy interval attribute specifying the certain period of time, and the first file has a modification time attribute specifying when the first file was created or last modified, and the checking of whether or not the first file has been modified for the certain period of time in the step (b) is performed by comparing a value of the modification time attribute of the first file to a difference between a present system time and a value of the policy interval attribute.

17. The file server as claimed in claim 10, wherein the list of file identifiers includes entries for storing the file identifiers, and each entry has a modified time attribute indicating a system time when a file identifier was last stored in said each entry, and the step (c) of periodically scanning the list of file identifiers includes removing said each entry from the list of file identifiers when the modified time attribute of said each entry indicates that the entry is no longer useful for committing files to the WORM committed state.

18. The file server as claimed in claim 17, wherein the periodic scanning in step (c) is performed at a scan interval that is one-half of the certain period of time, and the modified time attribute of said each entry indicates that the entry is no longer useful for committing the file to the WORM committed state when the value of the modified time attribute is less than the difference between present system time and twice policy interval.

19. A method of operating a file server, the file server having data storage storing a file system, a data processor coupled to the data storage for access to files in the file system, and non-transitory computer readable storage medium coupled to the data processor and storing computer instructions, wherein the computer instructions, when executed by the data processor, automatically protect the files from modification upon expiration of a certain period of time and commit the files to a write-once-read-many (WORM) committed state by the steps of:
(a) placing file identifiers of the files on a list of file identifiers;

(b) in response to a request from a client to modify a first file, checking whether or not the first file has been modified for the certain period of time, and in response to finding that the first file has not been modified for the certain period of time, denying the request from the client to modify the first file; and
(c) periodically scanning the list of file identifiers, and upon finding a file identifier of a second file on the list of file identifiers, checking whether or not the second file has been modified for the certain period of time, and in response to finding that the second file has not been modified for the certain period of time, committing the second file to the WORM committed state;
wherein step (a) includes placing a first instance of a file identifier identifying a third file on a tail of the list of file identifiers when the third file is created, and later placing a second instance of the file identifier of the third file on the tail of the list of file identifiers when the third file is modified; and
wherein the list of file identifiers includes entries for storing the file identifiers, and each entry stores multiple file identifiers, and each entry has a minimum modification time attribute indicating a minimum value of modification time attributes of the files identified by the file identifiers stored in said each entry, and the step (c) of periodically scanning the list of file identifiers includes skipping over the file identifiers in said each entry when the minimum modification time attribute of said each entry indicates that none of the files indicated by the file identifiers stored in said each entry has not been modified for more than a certain interval of time.

20. The method as claimed in claim 19, which further includes placing a second instance of a file identifier of a fourth file on the tail of the list of file identifiers when a first instance of the file identifier of the fourth file is found on the list of file identifiers during scanning of the list of file identifiers and the fourth file is found to have a modification time attribute specifying a modification time in future.

21. The method as claimed in claim 19, wherein the list of file identifiers includes entries for storing the file identifiers, and each entry has a modified time attribute indicating a system time when a file identifier was last stored in said each entry, and the step (c) of periodically scanning the list of file identifiers includes removing said each entry from the list of file identifiers when the modified time attribute of said each entry indicates that the entry is no longer useful for committing files to the WORM committed state.

22. The method as claimed in claim 21, wherein the periodic scanning in step (c) is performed at a scan interval that is one-half of the certain period of time, and a system time attribute of said each entry indicates that the entry is no longer useful for committing the file to the WORM committed state when a value of a modified time attribute is less than a difference between present system time and twice policy interval.

* * * * *